April 30, 1929.   I. GOLDBURG   1,711,382
PNEUMATIC TIRE
Filed Sept. 15, 1925   3 Sheets-Sheet 1
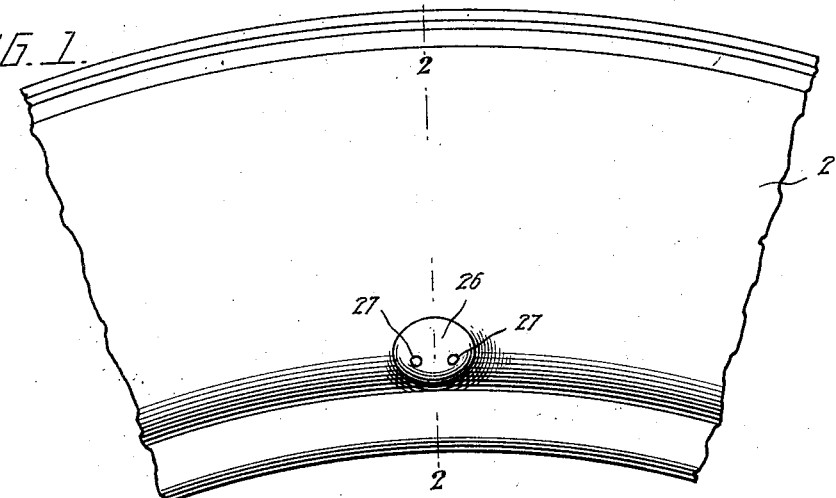
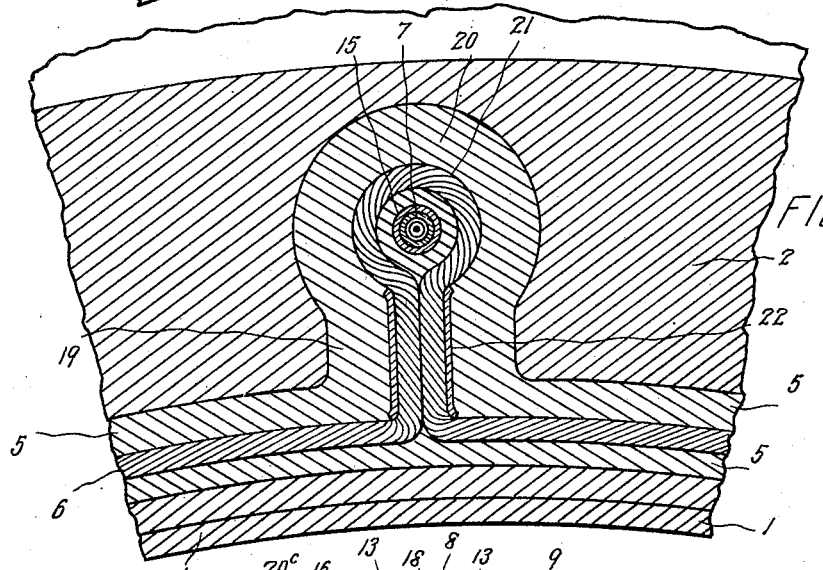
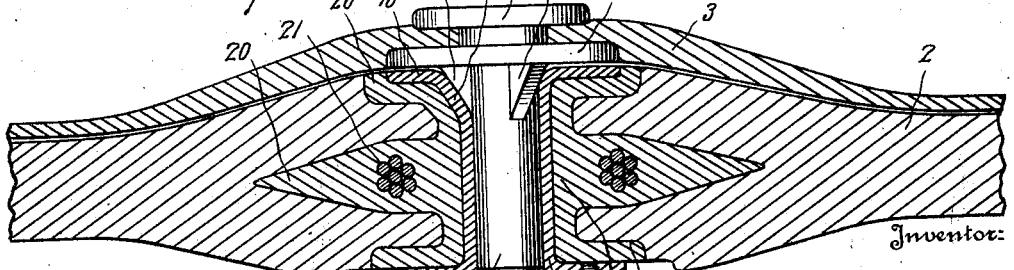
Inventor:
IRVING GOLDBURG
By Edgar M. Kitchin,
his Attorney.

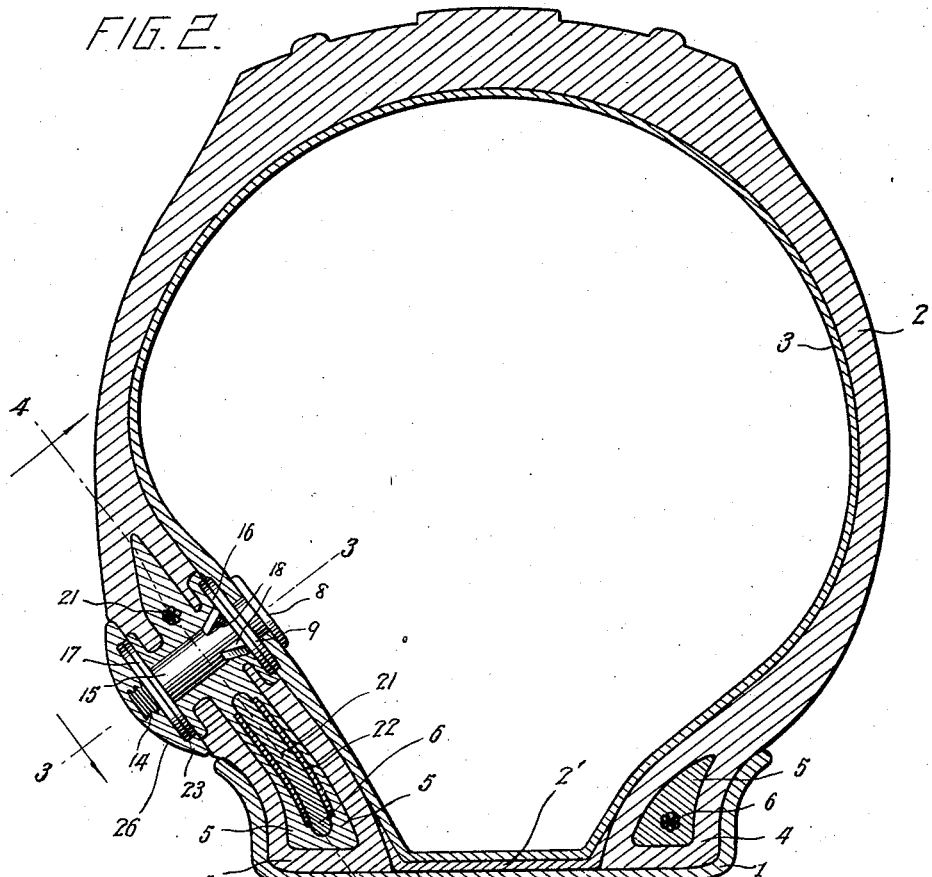
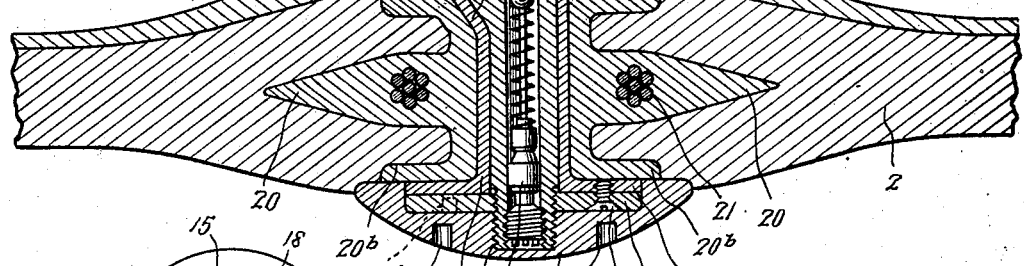

April 30, 1929.  I. GOLDBURG  1,711,382
PNEUMATIC TIRE
Filed Sept. 15, 1925   3 Sheets-Sheet 3
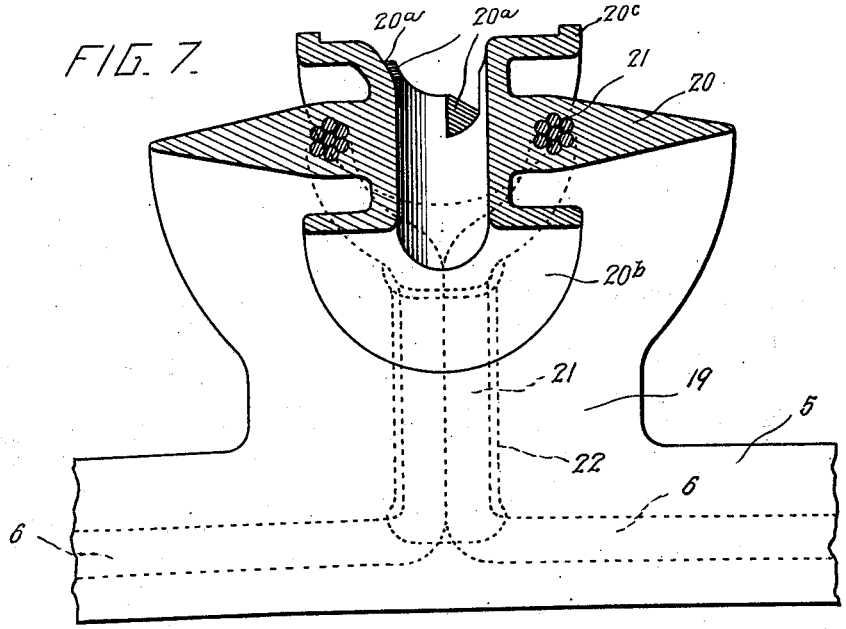
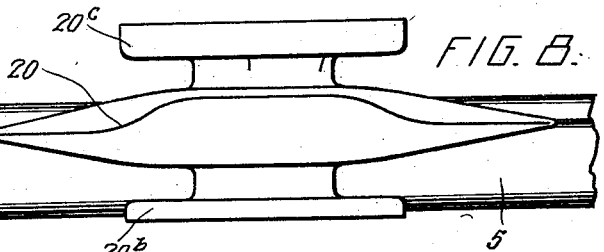
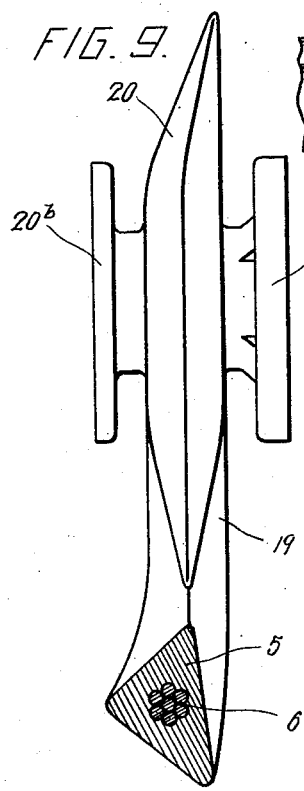
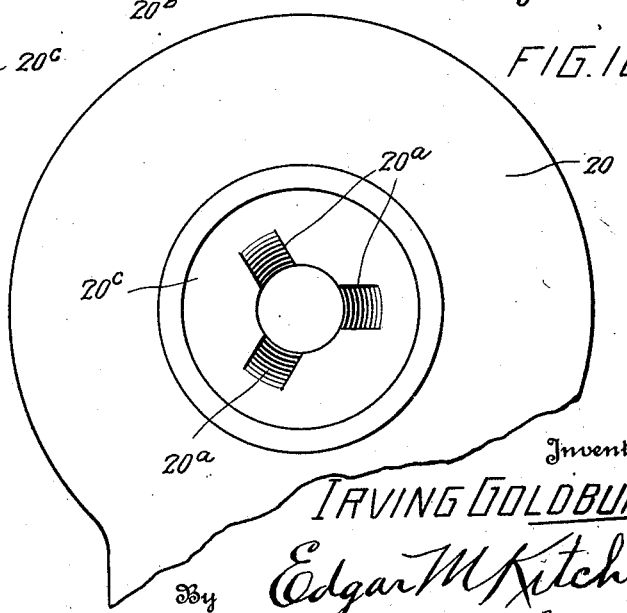
Inventor:
IRVING GOLDBURG
By Edgar M Kitchin
his Attorney.

Patented Apr. 30, 1929.

1,711,382

UNITED STATES PATENT OFFICE.

IRVING GOLDBURG, OF SUFFERN, NEW YORK.

PNEUMATIC TIRE.

Application filed September 15, 1925. Serial No. 56,540.

This invention relates to improvements in pneumatic tires for vehicle wheels, and more particularly to the type utilizing an inner tube and an exterior casing or shoe.

The primary object in view is the obviating of the necessity for the difficulty and labor of the separation of a tire and its tire-carrying rim relative to each other incident to the presence of a radial, inwardly-extending valve stem projecting through said rim.

A further object in view is the effective inflation and maintenance of an inflated condition of the inner tube while eliminating the customary radial, inwardly-extending valve stem.

A more detail object is the location of an inflating valve accessible at the side of the tire instead of within the circle described by the tire and so constructed and guarded as to preclude relative movement of the inner tube carried parts with respect to the casing carried parts.

With these and further objects in view as will in part hereinafter become apparent and in part be stated, the invention comprises certain novel constructions, combinations and arrangements of parts as subsequently specified and claimed.

In the accompanying drawings,—

Figure 1 is a fragmentary view in side elevation of a tire embodying the features of the present invention.

Figure 2 is a transverse section therethrough taken on the plane indicated by line 2—2 of Figure 1, the parts being seen on an enlarged scale.

Figure 3 is a section taken on the plane indicated by line 3—3 of Figure 2, the valve stem being seen in section and fully seated and the interior parts in elevation. the scale being further enlarged.

Figure 4 is a section taken on the plane indicated by line 4—4 of Figure 2 on a scale enlarged with respect to that of Figure 2, but smaller than that of Figure 3.

Figure 5 is a section similar to Figure 3 on the same scale but with the valve stem seen in elevation and in its loosely seated position.

Figure 6 is a transverse section through the valve stem and its receiving sleeve detached, the parts being seen on the scale of Figure 3.

Figure 7 is a greatly enlarged detail sectional perspective of the hardened core or enlargement surrounding the anchorage sleeve for the valve stem, the parts being shown separated and detached from the casing in which they are normally embedded.

Figure 8 is a top plan view of the structure seen in Figure 7.

Figure 9 is an edge view thereof, the marginal bead core being seen in section.

Figure 10 is a fragmentary, rear elevation thereof.

It is, of course, well known to those familiar with the art that a great deal of difficulty is at times experienced in the assembling of a tire on a demountable rim, and especially in dismantling these parts incident to the presence of a radial, inwardly-extending inflation valve stem. This difficulty has been found to be greatly increased with the low pressure type of tires recently widely adopted for use and commonly referred to as "balloon" tires. Such a tire is illustrated in the accompanying drawings, and in Figure 2 is seen mounted on the ordinary "straight-side" demountable rim, but it should be understood that the present invention is well adapted for use in conjunction with any pneumatic tire comprising an outer shoe or casing and an inner tube which must be inflated and retained inflated by means accessible from the exterior of the casing.

Referring to the drawings by numerals, 1 indicates a demountable rim of any of the conventional types, such as the well known cross-cut, straight-side rim, but said rim may be of the quickly detachable type or otherwise so long as adapted for receiving the tire. The tire consists of the exterior shoe or casing 2 and the inner tube 3, the said casing 2, as shown in the drawings, being of the conventional "balloon" type, but the invention is applicable to any known type. It is customary to provide the casing 2 with marginal beads 4, 4, of non-elastic form, consisting of a hard rubber core 5 surrounded by the terminal portions of the fabric of the tire (and the term "fabric" here is intended to include cord construction), each core 5 having embedded within it a metallic band 6 preferably in the form of a multiple strand cable. These non-elastic or hard marginal beads 4, 4, are located in and removed from the rim 1 by any of many well known methods, such, for example, as the provision of a cross-cut through the rim 1 and the springing of one end of the rim out of place and the collapsing of the rim sufficiently for the required manipulation of the beads 4 relative thereto. This operation, when effected by a skilled operator, is not found difficult, especially when adequate machinery, such as customarily present in garages and machine shops, is available. The amount of collapsing or spring of the rim, however, is frequently increased by the conditions occasioned incident to the presence of a long valve stem extending through the rim 1, and when an ordinary automobile operator, such as the average owner, finds it necessary, at the road-side or other place inaccessible to facilitating machinery, to remove and replace a tire his already great difficulties are greatly enhanced and rendered burdensome by the excess strain incident to the presence of the valve stem. It is also to be observed that while it is common to "rock" an ordinary demountable rim onto a wheel, it is nevertheless necessary to provide an aperture through the demountable rim and through the fixed rim and felly through which the radial, inwardly-extending valve stem must be introduced before the rocking operation can be effected. With balloon tires, accessibility of the valve stem to the aperture in the fixed rim and felly is frequently rendered difficult by the relatively cramped space between the fender of the automobile and the felly, and this is true perhaps in a varying degree with other forms of pneumatic tires than the balloon. These difficulties are overcome by the present invention. With disk wheels, special provision must be made to accommodate the radially extending valve stem. The present invention eliminates the necessity for the aperture in the demountable rim and in the felly portion of the wheel, and, of course, eliminates the difficulties incident to adapting a valve stem to a disk wheel.

Extended and careful tests have demonstrated that many dangers are presented in any attempt to deliver air through the side of the casing or shoe to the inner tube, because of the ease with which relative movement between parts may occur and the difficulty of overcoming such movement. The walls of the shoe are normally elastic, and a tube extending therethrough, even though clamped against such walls, may rock incident to the elasticity of such walls, and the slightest relative movement soon develops under the strain of usage into excessive play and concludes either with destruction of the casing or the rupture of the anchorage of the stem to the inner tube or both. These difficulties also have been fully overcome by the present invention.

To this end, the inner tube 3 is engaged by an outstanding valve stem 7. The valve stem 7 is of special construction, being provided at its inner extremity with a surrounding flange 8 adapted to clamp the inner face of the tube 3 and being provided just outside the tube 3 with a clamping annulus 9, the annulus being threaded at 10 onto a threaded, flanged portion 11 of the stem 7 spaced from the flange 6 a distance accommodating part of the tube 3. The tube 3 is apertured for the passage of the stem, and, in assembling, the material about the aperture is stretched over the flange 8 and springs back into the space between the flange 8 and the flange 11. Then the material of the inner tube is clamped to a non-leaking engagement with the flange 8 by the screwing down of the annulus 9. Rotation of the annulus 9 is preferably accomplished by a spanner wrench or like tool engaging apertures 12, 12, disposed for receiving the same. The material of the tube 3 is preferably somewhat thickened at and adjacent the place of engagement with the valve stem to adapt the tube for intimate contact with the adjacent, specially constructed, parts of the casing 1. Outward of the threaded flange 11, the valve stem 7 is provided with inclined fillets or wedgelike webs 13, 13. As many of the webs 13 are provided as desired, it being preferable to employ at least three, as best seen in Figure 6, to insure against any possible rocking or lateral play of the stem when finally seated. The valve stem 7 is exteriorly smooth and cylindrical from the outer extremity of the webs 13 to a point near the outer end of the stem at which the stem is provided with external threads 14 extending to the outer extremity.

The casing 2 is provided with a specially constructed aperture for accommodating the stem 7. Said aperture is lined with a metallic sleeve 15 terminating at its inner end in an annular flange 16, and at its outer end in a similar flange 17. The inner portion of sleeve 15 as it approaches the flange 16 is provided with inwardly-flaring or inclined grooves 18, 18, corresponding in number, shape and location to the webs 13 and adapted to snugly receive the same, the parts being proportioned to afford a seating stress or tensioning under a wedging action of the webs as they come to their final, seated position from the position seen in Figure 5 to the position seen in Figure 3. The sleeve 15 is internally proportioned to snugly receive the smooth, cylindrical portion of the stem 7. Since, if the liner or sleeve 15 were merely located in the ordinary flexible wall of a tire casing it would be liable to movement incident to the elasticity of such wall, provision is made against such relative movement by the employment of anchorage means to the adjacent marginal bead 4. This anchorage means preferably assumes the form, as shown in the accompanying drawings, of an extension of the core 5 and the cable 6 up and about the sleeve 15 for rigidly retaining the same against circumferential or radial movement relative to other parts of the casing 2. The hard rubber core 5, as best seen in Figures 4 and 7, is extended in a body 19 upward to and about the sleeve 15, the said hard rubber being preferably arranged to directly engage the outer face of the sleeve and the adjacent faces of the flanges 16 and 17, and being also shaped, as best seen in Figures 7 to 10, to provide an annular enlargement 20 surrounding the middle portion of the sleeve 15, the said annular enlargement having embedded therein the loop or extended portion 21 of the cable 6. The cable may be thus extended from the bead 4 in any appropriate manner, but care must be exercised to prevent any possible opportunity for elongation of the cable incident to expanding stresses on the rim 1 exerted against and resisted by the hard beads 4. To this end, the extended laps of the cable to form the loop 21 are enclosed in a metallic sleeve 22 which resists any expanding stresses tending to elongate the cable 6 and to pull said laps of the cable apart. Other means may, of course, be provided for anchorage of the sleeve 15 to the hard bead 4 within the spirit and scope of the present invention, and, in fact, it is contemplated that other anchorage means may be provided for retaining the sleeve 15 and the stem 7 against possible relative movement with respect to the casing 2 independently of the hard bead 4.

When the parts are assembled, the threaded portion 14 of stem 7 is engaged first by a relatively thin or washerlike nut 23 for retaining the parts in place during the operation of inflating the inner tube and prior to the covering of the stem for regular use. In assembling the parts, the tube is introduced into the shoe in the usual manner, except that the valve stem 7 is thrust through the sleeve 15 in lieu of the location of the radial valve between the marginal beads of the shoe or casing 2. The parts are then in the position indicated in Figure 5. The washer-like nut 23 is then applied and threaded to the position seen in Figure 3 which effects a drawing of the stem 7 outward under the wedging action of the webs 13 engaging the grooved portions 18 of the sleeve 15. The parts are proportioned to cause this stress to be sufficiently great, when the parts are finally seated, as seen in Figure 3, to effect a rigid engagement between the valve stem 7 and the sleeve 15. When this condition of the parts is reached, a locking screw 24 is passed through the nut 23 and threaded into a threaded aperture of the flange 17. Other appropriate locking means may be utilized for the nut 23 in lieu of the screw 24, but provision should be made to prevent accidental loosening of said nut 23. The operation of the nut 23 may be accomplished by any appropriate tool, such, for example, as the spanner wrench employed on the annulus 9, and to this end recesses 23' are formed in the nut 23.

A flap or liner 2' of the ordinary commercial form is applied about the inner part of the tire with the marginal portions of the flap lying between the beads 4 and the tube 3, so that, when assembled, the liner 2' will be interposed between the outer metal face of rim 1 and the inner tube 3. As is customary, the tube 2 may be slightly inflated for facilitating application of the parts to the rim 1, and it is found that the assemblage of the tire on the rim 1 is accomplished with great ease and facility incident to the fact that the inner face of the tire presents a smooth, uninterrupted cylinder with no radial inward projection.

The tube 7 is provided with the usual air check valve 25 of the ordinary commercial type, and after the parts have been assembled to the point of the application of the nut 23, as seen in Figure 3, air under pressure is introduced past the valve 25 to the extent required for the desired inflation of the tire whether of the balloon type or of the standard type. When this is accomplished, a cover plate or caplike nut 26 is applied to the outer extremity of the stem 7 and is threaded to the seated position seen in Figures 1 and 3. This cap nut is provided with spanner wrench receiving apertures 27, or other appropriate tool-receiving means for facilitating application and removal. The nut 26 may, of course, assume any of various contours, but is preferably especially adapted to guard the inner parts against the effect of frictional contact with curbings, stones, and other obstructions liable to be struck during use, and to this end the nut 26 is preferably offset at its inner face to snugly receive the nut 23 and flange 17 and to contact with the hard rubber core and overlie some of the regular elastic portion of the casing 2 outward of and beyond the hard rubber. The outer face of the nut 26 is preferably curved to best adapt it for serving as a chafing plate during use.

It is, of course, apparent that the anchorage of the sleeve 15 in non-movable relation to the casing 2 is of essential importance, and the hard rubber core which is extended up and about the sleeve 15 in the form of the enlargement 20 has been designed to most effectively accomplish this end. This enlarged core may assume any of various shapes best adapted for the purpose, but one effective form has been found to consist of the arrangement of the parts of the core as seen in detail in Figures 7 to 10 inclusive from which it will be seen that the enlargement 20 has a central bore or passage to accommodate the sleeve 15 with the inner end of the bore provided with grooves 20ª, 20ª to accommodate the enlargements of the sleeve providing the grooves 18 therein. Each end of the sleeve portion of enlargement 20 of the hardened core terminates in an annular flange, the outer being indicated at 20ᵇ and the inner at 20ᶜ. Flange 20ᵇ is in the form of a substantially flat annulus presenting a hard back for the inner face of the flange 17 of sleeve 15, while the flange 20ᶜ is preferably shaped to conform not alone to the outer face of the flange 16, but to encircle the edge thereof. The core 20 with its details is preferably formed and located in place in the usual manner of forming and locating the core of each of the hard marginal beads of the customary commercial tire casing or shoe.

What is claimed is:—

1. The combination of a tire casing having a non-elastic bead, an inner tube within the casing, a valve stem projecting from the inner tube through the side of the casing, and means of rigid anchorage of the valve stem to the non-elastic bead.

2. In pneumatic tire structures, a tire casing having a non-elastic marginal bead, and valve stem anchorage means at the side of the tire connected to said bead.

3. In pneumatic tire structures, a tire casing having a non-elastic marginal bead, rigid valve stem anchoring means at the side of said casing, and a non-elastic connection between the rigid anchoring means and the non-elastic bead.

4. In pneumatic tire structures, a tire casing having a marginal bead formed with a metallic core, and valve stem anchorage means at the side of the casing anchored to said core.

5. The combination of a tire casing, an inner tube therein, a valve stem for the inner tube extending through the wall of the casing, and wedging means for anchoring the valve stem rigidly to the casing against movement relative to the casing.

6. The combination of a tire casing, an inner tube therein, a valve stem extending through the wall of the casing, threaded anchorage means for the valve stem, and wedging means actuated by the threaded anchorage means for effecting a rigid anchorage of the valve stem to the casing.

7. In pneumatic tire structures of the inner tube type, a tire casing having a valve stem passage through the material of the casing surrounded by rigid inelastic walls, said inelastic walls being formed integral with the casing.

8. In pneumatic tire structures of the inner tube type, the combination of a tire casing having a valve stem opening through the material of the casing surrounded by an inelastic wall, an inner tube within the casing, a valve stem extending from the inner tube through said opening, and wedging means engaging the valve stem and inelastic wall of the valve stem opening for effecting a non-movable contact between the valve stem and the inelastic wall.

9. In pneumatic tire structures of the inner tube type, the combination of a tire casing having a valve stem opening through the material of the casing surrounded by an inelastic wall, an inner tube within the casing, a valve stem carried by the inner tube and extending through said opening, said valve stem having inclined webs engaging the inelastic wall, and means for anchoring the valve stem within said opening with the webs drawn to a wedging position.

10. The combination of a pneumatic tire casing having a valve stem opening through the material of the casing formed with a rigid, non-elastic wall, an inner tube within the casing, a valve stem extending through the valve stem opening, and a chafing nut threaded onto the outer end of the valve stem in position for clamping the stem rigidly within the non-elastic wall of the opening.

11. The combination of a tire casing having a non-elastic bead extending about the case circumferentially thereof, an inner tube within the casing, a valve stem communicating through the inner tube and extending through the side of the casing, and means of rigid anchorage of the valve stem to the non-elastic bead.

12. The combination of a resilient tire casing having a non-resilient part, an inner tube within the casing, a valve stem projecting from the inner tube through the side of the casing, and means of non-resilient anchorage of the valve stem to the non-resilient part of the tire casing.

13. In pneumatic tire structures of the inner tube type, a resilient tire casing having a valve stem passageway formed through the side thereof, said casing having a non-resilient part, and means of non-resilient anchorage of the walls of said passageway to said non-resilient part.

In testimony whereof I affix my signature.

IRVING GOLDBURG.